United States Patent [19]

Summers et al.

[11] Patent Number: 4,591,380
[45] Date of Patent: May 27, 1986

[54] METHOD OF GENERATING A REDUCING GAS

[75] Inventors: Frank V. Summers; David C. Meissner; Ronald Brown, all of Charlotte, N.C.

[73] Assignee: Midrex International B.V. Rotterdam, Zurich Branch, Zurich, Switzerland

[21] Appl. No.: 772,281

[22] Filed: Sep. 4, 1985

Related U.S. Application Data

[63] Continuation-in-part of Ser. No. 556,502, Dec. 1, 1983, abandoned, which is a continuation-in-part of Ser. No. 360,713, Mar. 22, 1982, abandoned.

[51] Int. Cl.$^4$ .............................................. C21B 13/06
[52] U.S. Cl. ........................................ 75/35; 48/92; 266/156
[58] Field of Search .................... 75/34, 35, 38, 40; 48/92; 266/156

[56] References Cited

U.S. PATENT DOCUMENTS

| | | | |
|---|---|---|---|
| 3,853,538 | 12/1974 | Nemeth | 75/35 |
| 4,238,226 | 12/1980 | Sanzenbacher et al. | 75/38 |
| 4,248,626 | 2/1981 | Scarlett et al. | 75/38 |
| 4,422,872 | 12/1983 | Geskin | 75/51 |

FOREIGN PATENT DOCUMENTS 2078779  1/1982  United Kingdom .................... 75/29

Primary Examiner—Melvyn J. Andrews
Attorney, Agent, or Firm—Ralph H. Dougherty

[57] ABSTRACT

A method for forming a reducing gas in a molten metal bath gasifier and simultaneously directly reducing iron oxide in a shaft furnace with the gas thus produced, wherein the bath coolant is preferably provided by cleaned recycle gas from the direct reduction shaft furnace.

10 Claims, 3 Drawing Figures

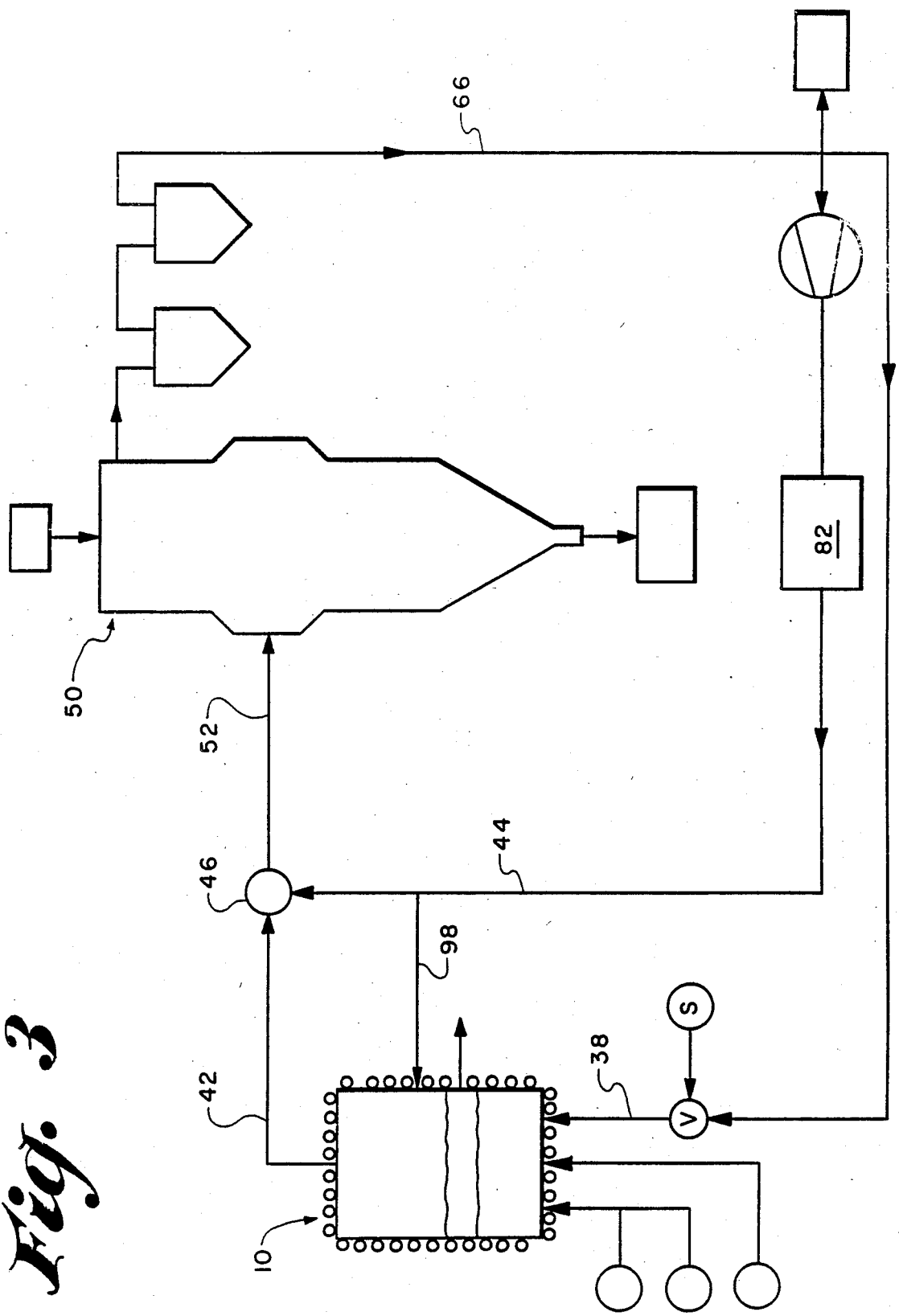

METHOD OF GENERATING A REDUCING GAS

CROSS-REFERENCE TO RELATED APPLICATIONS

This is a continuation-in-part application of U.S. patent application Ser. No. 556,502, filed Dec. 1, 1983, now abandoned which is a continuation-in-part application of U.S. patent application Ser. No. 360,713, filed Mar. 22, 1982 now abandoned.

BACKGROUND OF THE INVENTION

This invention concerns a method and apparatus for generating a low-sulfur reducing gas by the gasification of carbonaceous fuel in a molten iron bath. Fuel, oxygen and a slag former are injected into the molten metal bath through the bottom of the bath-containing vessel. The reaction within the vessel is cooled by the injection of a gaseous coolant which is recycled spent top gas from a direct reduction shaft furnace, steam or a mixture thereof.

The present invention is an improvement to German OLS 27 50 275, which teaches the generation of a reducing gas in a molten metal bath. The known gasifier is noted for its refractory wear. The present invention alleviates the refractory wear problem by maintaining the bath temperature of the gasifier at a lower level. This is achieved by injecting a coolant into the molten metal bath to cool the reaction.

Sanzenbacher et al. U.S. Pat. No. 4,238,226 and Scarlett et al. U.S. Pat. No. 4,248,626 both describe methods for producing gas for direct reduction and the melting of direct reduced iron in a chamber containing a molten metal bath. No coolant is used in either of these processes because the melting of the direct reduced iron maintains the temperature of the molten metal bath in the desired range. A portion of Sanzenbacher's cooled gas from the cyclone provides compressed gas as a carrier for injection of coal into the bath, which compressed gas is not capable of providing sufficient cooling capacity to control the temperature of the bath, as the amount of carrier gas required to inject coal is too small to provide the needed coolant. Scarlett et al teaches injection of a humidified cooling gas above the melt, which has no effect on the melt.

Nemeth U.S. Pat. No. 3,853,538 teaches the use of a conventional entrainment gasifier which generates a molten slag from ungasified fuel and ash. Since there is no iron in the Nemeth gasifier, any cooling that would take place in the gasifier would clearly not take place in a molten iron bath.

Geskin U.S. Pat. No. 4,422,872 teaches a method for producing a gaseous fuel and heat from a melt by injecting air, coal, and steam into a melt. The heat evolved is abstracted from the melt by injection of heated gases into molten slag, rather than by injection of cooled, $CO_2$-lean off-gases from a direct reduction furnace into a molten iron bath.

British Patent Application No. 2,078,779A teaches that waste gases may be used to transport carbon-carrying material to the nozzles and/or to cool the nozzles, which is not analogous to cooling of the melt.

Although a carrier gas is used to inject coal or a carbon containing medium into the melt in some of the above-mentioned references, the amount of this carrier gas is so insignificant that it is inadequate to perform any appreciable cooling or even to have any real effect on the process.

The present invention also provides a well-balanced reducing gas for the direct reduction of iron. This is achieved by maintaining the operating temperature of the molten bath gasifier above the iron-carbon eutectic point.

In the direct reduction of iron oxide to metallized iron in a shaft furnace, the reacted top gas is superheated and must be cooled immediately upon removal from the furnace. The present invention utilizes this superheat to calcine lime for sulfur removal from the shaft furnace.

OBJECTS OF THE INVENTION

It is the principal object of this invention to provide a method and apparatus for generating a reducing gas in a molten metal bath, in cooperation with a shaft furnace for the direct reduction of iron oxide to metallized iron.

It also an object to provide a process that is highly efficient and results in a substantially sulfur-free metallized iron as well as a substantially sulfur-free spent top gas.

BRIEF DESCRIPTION OF THE DRAWINGS

This invention is better understood by referring to the following detailed description and the appended drawings in which:

FIG. 3 is yet another alternative flow sheet for achieving the objects of the present invention.

DETAILED DESCRIPTION

Figure 1:
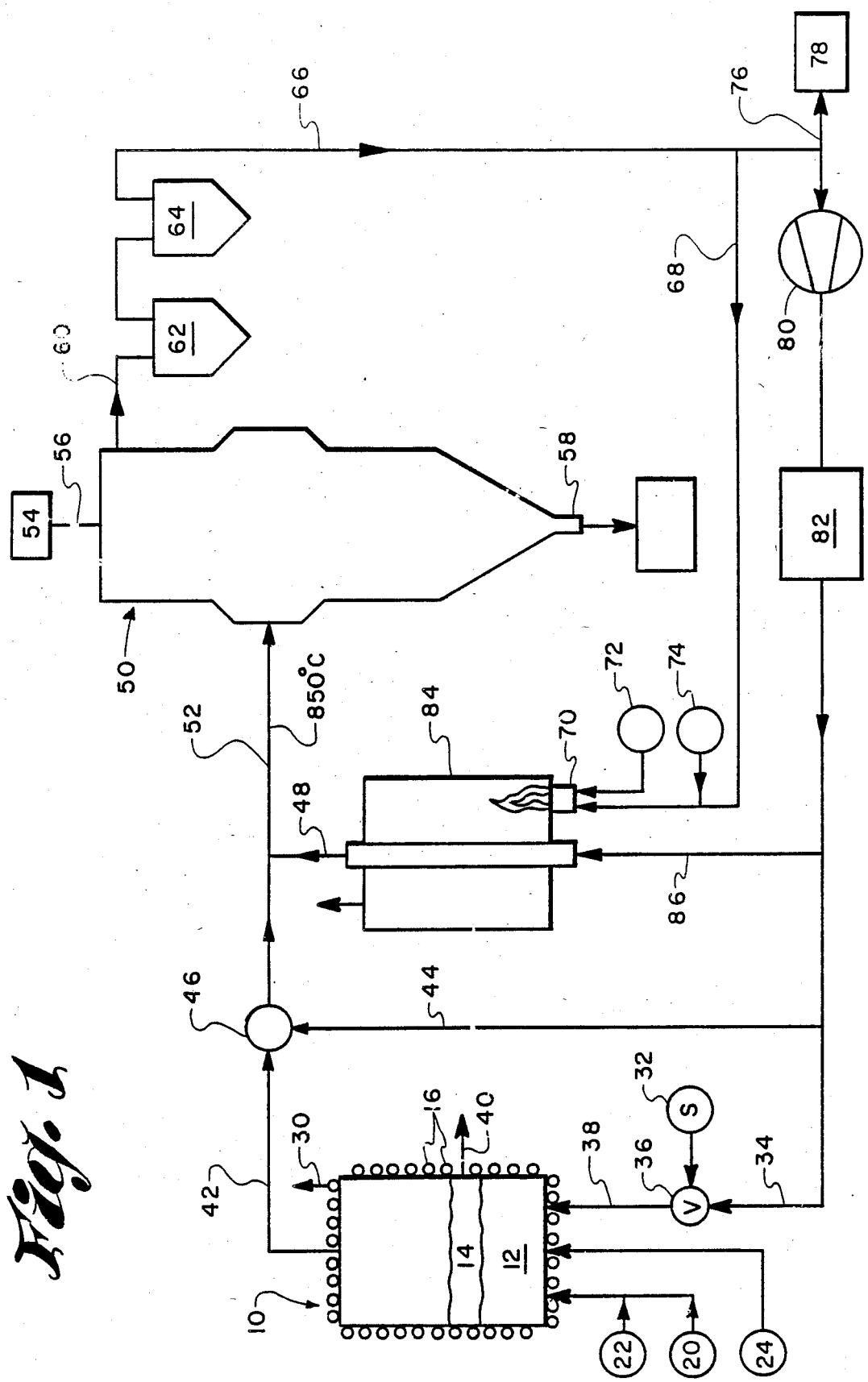
FIG. 1 is a schematic diagram of a preferred embodiment of the invention showing a molten bath gasifier for supplying reducing gas to a shaft furnace and the necessary auxiliary equipment.

Referring now to FIG. 1, a molten bath gasifier 10 contains a molten iron bath 12 and a fluid slag 14. Cooling coils 16 surround the gasifier; fuel such as coal from source 20 is injected into the bath through the bottom of the gasifier. A flux such as lime from source 22 is injected into the bath as needed to adjust the fluidity of the slag and to assist in sulfur removal. The slag is a mixture of molten ash, lime and magnesia from the flux, refractory lining material, calcium sulfide from the reaction of sulfur in the fuel with lime, and FeO in equilibrium with the molten iron bath. Oxygen from source 24 is also injected into the bath through the bottom of the gasifier to oxidize and gasify the fuel to carbon monoxide.

Suitable fuels are coal, a hydrocarbon, charcoal, coke oven gas, or mixtures thereof. The preferred fuel is powdered coal.

External cooling of the gasifier is provided by coils 16. Water from source 28 passes through the coils and emerges as steam from line 30. It is desired to maintain the operating temperature of the gasifier at about 1500° C. Steam from source 32 or carbon dioxide-lean top gas from line 34 or a combination controlled by valve 36 are injected into the molten bath through line 38. The temperature of the bath is monitored by a device (not shown) which controls the operation of valve 36 and thus the injection of steam and/or cleaned top gas.

Molten slag 14 is removed from the gasifier at outlet 40 as required. Hot partial oxidation gas (reducing gas) is removed from gasifier 10 through line 42 after which it is tempered or quenched to a temperature below slag fusion temperature by carbon dioxide-lean top gas from line 44 in quencher 46. Heated carbon dioxide-lean top gas from line 48 is added to the quenched reducing gas and the resulting mixture is introduced to counter-flow direct reduction shaft furnace 50 through line 52. Iron oxide from bin 54 is fed into furnace 50 through line 56 to form a packed bed burden therein. The downwardly moving iron oxide burden is reduced to metallized iron by countercurrent flow of the reducing gas. Metallized iron product is removed at outlet 58 from the furnace and spent top gas is removed from the furnace via line 60. If desired, lime or limestone may be fed to the furnace through line 56 to form a part of the descending burden. The heat in the spent top gas will calcine the lime. If there is any appreciable sulfur in the reducing gas, it will combine with the calcium as calcium sulfide, which is removed with the metallized iron along with any unreacted calcium oxide through discharge pipe 58. This will prevent contamination of the direct reduced iron with sulfide as well as preventing contamination of the spent top gas.

Because of thermodynamic restrictions, not all of the hydrogen and carbon monoxide in the reducing gas will react with the iron oxide, thus the spent top gas remove through line 60 contains valuable hydrogen and carbon monoxide. The spent top gas is passed through cooler 62 and scrubber 64 to reduce the gas temperature and remove water and dust from the gas. A portion of the cleaned, cooled top gas passes through lines 66 and 69 to be used as fuel for burner 70. Combustion air is provided from source 72 and additional fuel may be injected from source 74 if necessary for proper operation of burner 70. If it is desired to produce export fuel for other processes, such export fuel may be withdrawn from line 66 through line 76 and stored in tank 78.

The major portion of the spent top gas from line 66 is compressed in compressor 80, then cleaned of carbon dioxide in an acid gas removal system 82. The resulting $CO_2$-lean top gas is used in three ways, first to cool the molten metal bath through lines 34 and 38; second, to temper the gasified reducing gas through line 44; and third, to be introduced to heater 84 through line 86 to be re-heated for controlling the temperature of the reducing gas in line 52.

In operation, the temperature of the molten metal bath is maintained at a desired operating temperature of between 1350° and 1600° C., preferably about 1500° C. The slag layer is adjusted to be molten at the operating temperature range of between 1350° and 1600° C. This is accomplished by maintaining a proper basicity ratio in the slag. Basicity ratio is the ratio of $CaO$ to $SiO_2$, or is sometimes expressed as the ratio of $CaO$ plus $MgO$ to $SiO_2$ plus $Al_2O_3$. Since $MgO$ and $Al_2O_3$ are only present in small quantities, the former ratio is most often used. The temperature of the reducing gas in line 52 is maintained between 800° and 900° C., and preferably at a temperature of about 850° C. to provide a reducing gas which will react with the iron oxide burden, but will not melt the metallized iron product.

The molten metal layer consists substantially of iron, with about 1.5% to about 4.5% carbon, small quantities of phosphorus and silicon within normal impurity limits, the small quantities of other metallic components from the slag.

Coal entering the molten metal bath is devolatilized in both the gas and bath phases, carbon remaining in the bath, but hydrogen being vaporized out from the volatiles in the coal. Oxygen reacts with the carbon in the bath in both the coal phase and the bath phase, with some carbon being dissolved in the bath. No carbon compounds are driven off from the bath. The amount of oxygen injected into the bath is adjusted to react with the fixed carbon in the coal in a barely sufficient amount to form carbon monoxide. This reaction will continue to generate heat above 1600° C. Cooling can be accomplished by direct contact with a cold gas and/or by direct contact with a endothermic reactive gas. Such gases are hydrogen, carbon monoxide, carbon dioxide, and steam. Carbon dioxide and steam will also react with the carbon in the bath.

Cleaned, cooled top gas contains principally CO, $H_2$, often some methane, and small quantities of $H_2O$ and $CO_2$. The amount of recycled $CO_2$ lean top gas introduced through inlet pipe 38 is from about 40 to about 300 NCM per ton of direct reduced iron product produced in shaft furnace 50, and passed out of the furnace through discharge 58. The preferred range of recycled top gas is from 70 to 250 NCM of gas per ton of direct reduced iron product. The breadth of the range is required because of the broad spectrum of coals available at different locations around the world.

The heat of reforming is endothermic. The following reforming reactions show why injection of these gases cools the bath:

| | | Heat of Reaction |
|---|---|---|
| $H_2O + CH_4$ | $CO + 3H_2$ | 2418 kCal/NCM of $CH_4$ |
| $CO_2 + CH_4$ | $2CO + 2H_2$ | 2716 kCal/NCM of $CH_4$ |
| $CO_2 + C$ | $2CO$ | 1728 KCal/NCM of $CO_2$ |
| $H_2O + C$ | $CO + H_2$ | 1430 kCal/NCM of $H_2O$ |

In order to determine the amount of carrier gas needed to convey particulate coal in comparison to the amount of gas needed to act as coolant, a computer simulation was made. Solids can be carried in the dense phase when the solids to gas ratio is over 50 kg/kg of carrier gas. This is equivalent to about 64 kg of coal per normal cubic meter of gas. Testing systems for carrying coal typically utilize coal to gas rates of about 25 to 30 kg/NCM (0.033 to 0.04 NCM/kg of coal). When nitrogen is utilized to carry the coal at the rate of 28.4 kg/NCM (0.0352 NCM/kg of coal), additional cooling, for example in the form of steam, is required to cool the molten bath at the rate of 6.09 kg of coal per NCM of steam (0.0164 NCM steam/kg coal). When humidified, carbon dioxide lean top gas is utilized as coolant, the coal to coolant rate is 1.77 kg/NCM (0.565 NCM/kg of coal). Thus it is seen that coolant is required at rates far in excess of the carrier gas requirements.

In another example, the following tables provide the results of a heat and material balance. Table 1 shows a coal analysis for a hard coal in weight percent on a moisture free basis. The moisture in the coal as fed to the gasifier was assumed to be 0.0250 kilograms of water per kilogram of coal.

TABLE 1

| Hard Coal Analysis | |
|---|---|
| C | 75.2 |
| H | 5.0 |
| N | 1.5 |
| O | 9.0 |
| S | 0.0 |
| Ash | 9.3 |

The heating value of the coal expressed as higher heating value (HHV) is 7491 Kcal/kg.

Table 2 provides the flow rate of the materials entering the gasifier. All materials flows in these examples are based upon the production of one metric tonne of direct reduced iron.

TABLE 2

| Gasifier Inputs | |
|---|---|
| Coal: | 2.803 Gcals, 374.2 kilograms |
| Oxygen: | 220.8 NCM containing 98.0% $O_2$ |
| $CO_2$ Lean Gas From the Carbon Dioxide Removal Unit: | 211.4 NCM |

From the gasifier, a total of 966.5 NCM of partial oxidation gas is removed from the gasifier.

The mix of gases before insertion into the reduction furnace is given in Table 3.

TABLE 3

| Gas Mixing for Feed to the Reduction Furnace | |
|---|---|
| Hot Partial Oxidation Gas From Gasifier: | 966.5 NCM |
| $CO_2$ Lean Top Gas: | 763.6 NCM |
| Heated $CO_2$ Lean Gas at 815° C.: | 211.1 NCM |

The total flow to the reduction furnace is 1941.2 NCM at a temperature of 850° C.

Table 4 describes the use of the scrubbed top gas after cooling and particulate removal:

TABLE 4

| Production and Use of Scrubbed Top Gas | |
|---|---|
| Scrubbed Top Gas: | 1703.2 NCM |
| Scrubbed Top Gas Used For Producing Steam and for Gas Heating: | 233.3 NCM |
| Scrubbed Top Gas to $CO_2$ Wash: | 1469.9 NCM |

Of the scrubbed top gas introduced to the carbon dioxide removal unit, approximately 364 NCM of carbon dioxide is removed and about 80.2 NCM of water is added (due to water saturation) to produce 1186.1 NCM of $CO_2$ lean gas.

Of the total $CO_2$ lean gas, 763.6 NCM is used to temper the partial oxidation (raw) gas from the gasifier, 211.4 NCM is used to cool the molten bath to maintain the temperature at 1400° C., and 211.1 NCM is heated for reuse.

The analysis of the major gas streams is shown in Table 5.

TABLE 5

| Gas Compositions | | | |
|---|---|---|---|
| Gas Component | Scrubbed Top Gas | $CO_2$ Lean Recycle Gas | Partial Oxidation Gas |
| CO | 31.32 | 38.82 | 62.44 |
| $CO_2$ | 25.57 | 1.00 | 0.13 |
| $H_2$ | 31.13 | 38.57 | 35.31 |
| $H_2O$ | 6.00 | 14.20 | 0.19 |
| $CH_4$ | 2.22 | 2.75 | 0.00 |
| $N_2$ | 3.76 | 4.66 | 1.93 |

The fuel to the gasifier was assumed to be at 25° C., the oxygen to the gasifier was assumed to be at 80° C. and the slag from the ash and the coal was assumed to be removed at 1400° C.

It will be noted that 211.4 NCM of $CO_2$ lean gas are required to cool the bath. Some of this gas acts as carrier gas to carry the 374.2 kilograms of gasifier fuel. At the rate of 0.04 NCM per kilogram of coal, 15.0 NCM of scrubbed top gas is required as carrier gas. The additional 196.4 NCM must be fed to the gasifier for the sole purpose of cooling the molten bath. The coal and the coal carrier gas are sufficient to cool the tuyeres by themselves.

In another example, a similar material balance was carried out using Montana Rosebud coal as the coal feed. Montana Rosebud is a sub-bituminous coal having the following analysis.

| | |
|---|---|
| C: | 65.70 |
| H: | 4.44 |
| N: | 0.89 |
| O: | 16.69 |
| S: | 0.00 |
| Ash: | 12.28 |

The heating value of the coal is 6359 kcal/kg. For the production of one metric ton of direct reduced iron, the total cooling gas required for the gasifier is 88.8 NCM per ton of DRI. The coal feed is 443.8 kilograms, requiring 17.8 NCM of carrier gas. The remaining 71 NCM is needed to cool the molten bath. The coal and its carrier gas are sufficient to cool the tuyeres.

From the foregoing analyses of the cooling gas requirements, it is clear that from about 4 to about 15 times as much coolant gas as carrier gas is required to provide the necessary bath cooling.

ALTERNATIVE EMBODIMENTS

Figure 2:
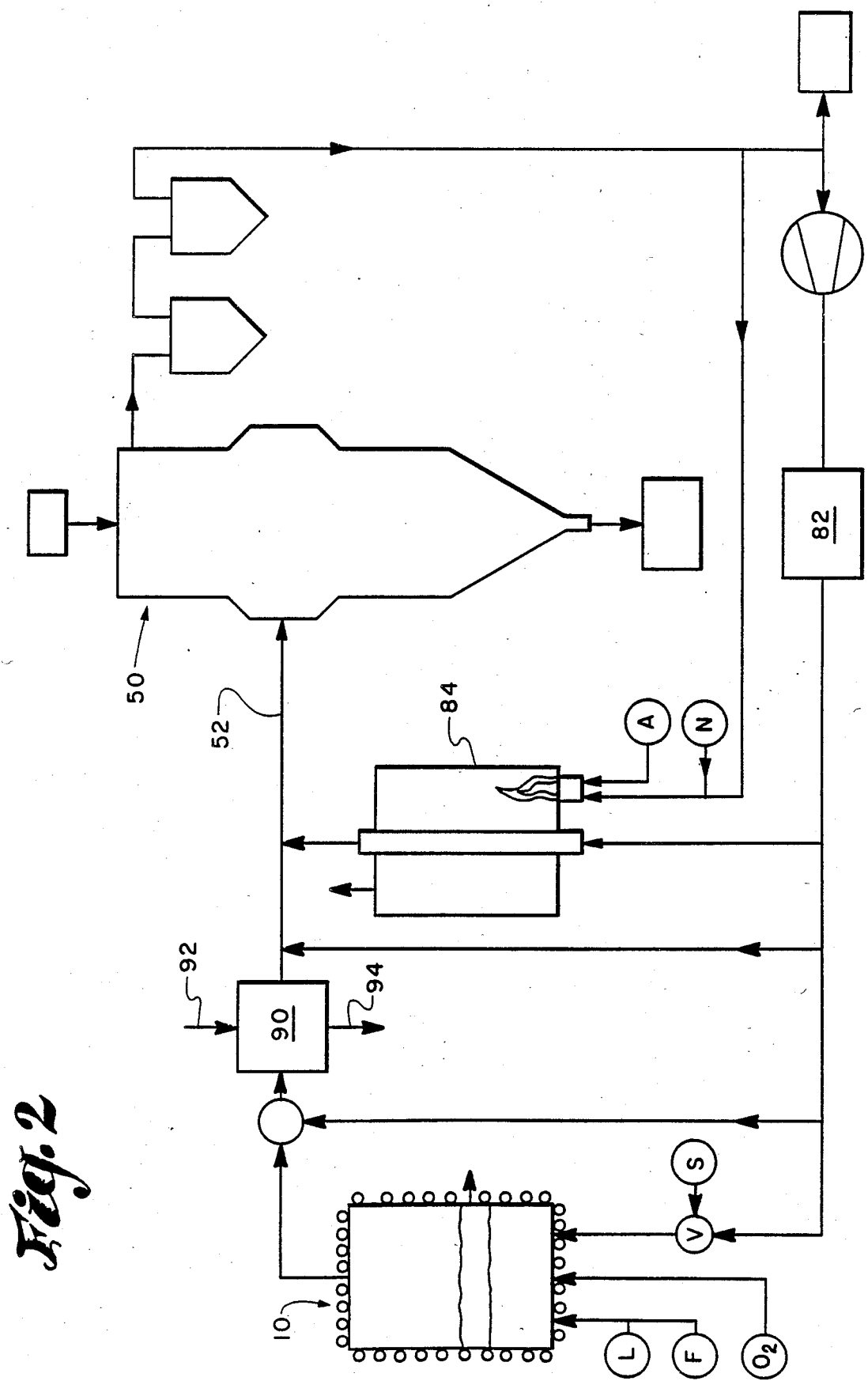
FIG. 2 is a schematic diagram similar to FIG. 1 showing an alternative flow sheet.

An alternative embodiment shown in FIG. 2 includes a sulfur removal system 90 into which calcium oxide is fed through line 92 and the reaction product, calcium sulfide, is removed through line 94. Thus, a substantially sulfur-free reducing gas is introduced to furnace 50 thorough line 52.

In an alternative embodiment shown in FIG. 3, the coolant injected into gasifier 10 through line 38 is cleaned, cooled, spent top gas having the same composition as in line 66. The carbon dioxide removal system 82 provides fuel rich gas for line 44, a portion of which is injected into gasifier 10 above the molten metal bath through line 98. This provides a somewhat cooler reducing gas in line 42, being on the order of about 1500° C. This reducing gas is then reduced to a temperature of about 850° C. in quencher 46 prior to its injection into the direct reduction furnace 50.

SUMMARY OF THE ACHIEVEMENTS OF THE OBJECTS OF THE INVENTION

From the foregoing, it is readily apparent that we have developed a method for generating a reducing gas in a molten metal bath, in cooperation with a shaft furnace for the direction reduction of iron oxide to metallized iron. The process is highly efficient and results in a substantially sulfur-free metallized iron as well as a substantially sulfur-free spent top gas.

What is claimed is:

1. In a method for generating a reducing gas wherein sulfur-containing fuel, oxygen and a flux are injected into a molten metal bath within a pressure-tight vessel beneath the surface of the bath to produce a partially-desulfurized partial-oxidation gas having a hydrogen and carbon monoxide content of at least 80%, the molten metal bath consisting essentially of from 1.5 to 4.5 percent carbon, the balance substantially iron, the molten metal bath having a slag layer thereon, the improvement comprising:

(a) injecting a coolant into the molten metal bath beneath the surface of the bath, said coolant being a fuel-rich gas selected from the group consisting of hydrogen, carbon monoxide, carbon dioxide lean spent top gas from a direct reduction furnace, methane, and any mixture thereof;

(b) maintaining the temperature of the molten metal bath between 1350° C. and 1600° C. by monitoring the molten metal bath temperature and increasing or decreasing the coolant flow rate to lower or raise the bath temperature respectively as required;

(c) quenching the partial-oxidation gas with carbon dioxide lean gas to produce a tempered reducing gas at a temperature between about 800° and 900° C.;

(d) introducing said tempered gas into a direct reduction furnace having an iron oxide burden therein to reduce the iron oxide to metallized iron product and form a top gas;

(e) removing the top gas from the furnace and removing a substantial portion of the carbon dioxide therefrom to form a $CO_2$-lean gas; and (f) introducing said $CO_2$-lean gas to the bottom of the molten metal bath as a coolant to cool the metal bath.

2. A method according to claim 1 wherein the flux is in the form of limestone, dolomite or calcined dolomite.

3. A method according to claim 1 further comprising injecting fuel rich gas into said vessel above the bath to maintain the temperature of the partial-oxidation gas between 1350° and 1600° C.

4. A method according to claim 3 wherein the fuel rich gas is directed downwardly toward the molten metal bath.

5. A method according to claim 1 wherein said coolant is $CO_2$-lean spent reducing gas produced by the direct reduction of iron oxide to metallized iron.

6. A method according to claim 1 further comprising introducing a sulfur acceptor into said direct reduction furnace as a portion of said burden, whereby said sulfur acceptor will desulfurize both metallized iron product and the spent top gas.

7. A method according to claim 6 wherein said sulfur acceptor is selected from the group consisting of lime, limestone, dolomite and calcined dolomite.

8. A method according to claim 1 wherein from one-fifth to one-fifteenth of the volume of coolant gas is utilized as carrier gas for introduction of the fuel into the melt.

9. A method according to claim 1 wherein from 40 to 300 NCM of said $CO_2$-lean top gas is introduced to the bottom of the molten metal bath is a coolant per ton of metallized iron product produced in the direct reduction furnace.

10. A method according to claim 9 wherein from 70 to 250 NCM of said $CO_2$-lean top gas is introduced to the bottom of the molten metal bath as a coolant per ton of metallized iron product produced in the direct reduction furnace.

* * * * *